United States Patent
Klemmer et al.

(10) Patent No.: US 8,045,183 B2
(45) Date of Patent: Oct. 25, 2011

(54) METHOD FOR DETERMINING AT LEAST THE POSITION OF A MOVABLE PART OF A DRIVE UNIT SUCH AS AN INTERNAL COMBUSTION ENGINE OR THE SIMILAR

(75) Inventors: Detlef Klemmer, Schwanewede (DE); Andreas Huck, Minden (DE)

(73) Assignee: Thyssenkrupp Krause GmbH, Bremen (DE)

( * ) Notice: Subject to any disclaimer, the term of this patent is extended or adjusted under 35 U.S.C. 154(b) by 708 days.

(21) Appl. No.: 11/814,877

(22) PCT Filed: Nov. 16, 2005

(86) PCT No.: PCT/EP2005/012267
§ 371 (c)(1),
(2), (4) Date: Sep. 16, 2008

(87) PCT Pub. No.: WO2006/079377
PCT Pub. Date: Aug. 3, 2006

(65) Prior Publication Data
US 2009/0141289 A1 Jun. 4, 2009

(30) Foreign Application Priority Data
Jan. 28, 2005 (DE) .......................... 10 2005 004 248

(51) Int. Cl.
*G01B 11/14* (2006.01)
(52) U.S. Cl. ........................................ 356/615; 356/614

(58) Field of Classification Search .......... 356/614–615, 356/621–622; 324/175; 33/707; 123/90.11, 123/90.12, 90.15; 251/129.1, 129.15, 129.16; 92/85 B, 85 R, 85 A, 143; 250/214 R, 231.13–231.19, 200, 206, 216, 229, 231.1
See application file for complete search history.

(56) References Cited

U.S. PATENT DOCUMENTS

| | | | | |
|---|---|---|---|---|
| 3,543,739 A | * | 12/1970 | Mennesson | ................... 123/494 |
| 4,098,235 A | * | 7/1978 | Dickerson | ..................... 123/494 |
| 4,145,608 A | | 3/1979 | Shirasaki | |
| 5,065,012 A | * | 11/1991 | Moriyama et al. | ....... 250/231.14 |
| 5,113,693 A | | 5/1992 | Hata | |
| 5,506,681 A | | 4/1996 | Igaki | |
| 6,390,036 B1 | * | 5/2002 | Yuuki | ........................ 123/90.11 |

FOREIGN PATENT DOCUMENTS
DE 40 28 969 A1 4/1991
(Continued)

OTHER PUBLICATIONS
European Examination Report.
(Continued)

*Primary Examiner* — Tri T Ton
(74) *Attorney, Agent, or Firm* — Laurence P. Colton; Smith Risley Tempel Santos LLC

(57) ABSTRACT

A method for determining at least the position of a moving part of the drive assembly, in which the part is illuminated or exposed to light and thereby the passage of light between the moving part and a part which corresponds thereto is determined. The passage of light changes or can even be briefly interrupted during the movement of the part. As a result, it is possible to obtain reliable information about the instantaneous position of the respective part. The method can be used more widely than the known capacitive determination of the position of a moving part and is, in particular, independent of the material of the part.

36 Claims, 1 Drawing Sheet

FOREIGN PATENT DOCUMENTS

| | | |
|---|---|---|
| DE | 201 16 202 U1 | 2/2002 |
| DE | 20116202 U1 | 2/2002 |
| GB | 465 406 A | 5/1937 |
| JP | 60-216015 | 10/1985 |
| JP | 2000-130122 | 5/2000 |

OTHER PUBLICATIONS

English Abstract for DE 201 16 202 Published on Feb. 21, 2002 Cited in IDS Filed on Dec. 15, 2008.

* cited by examiner

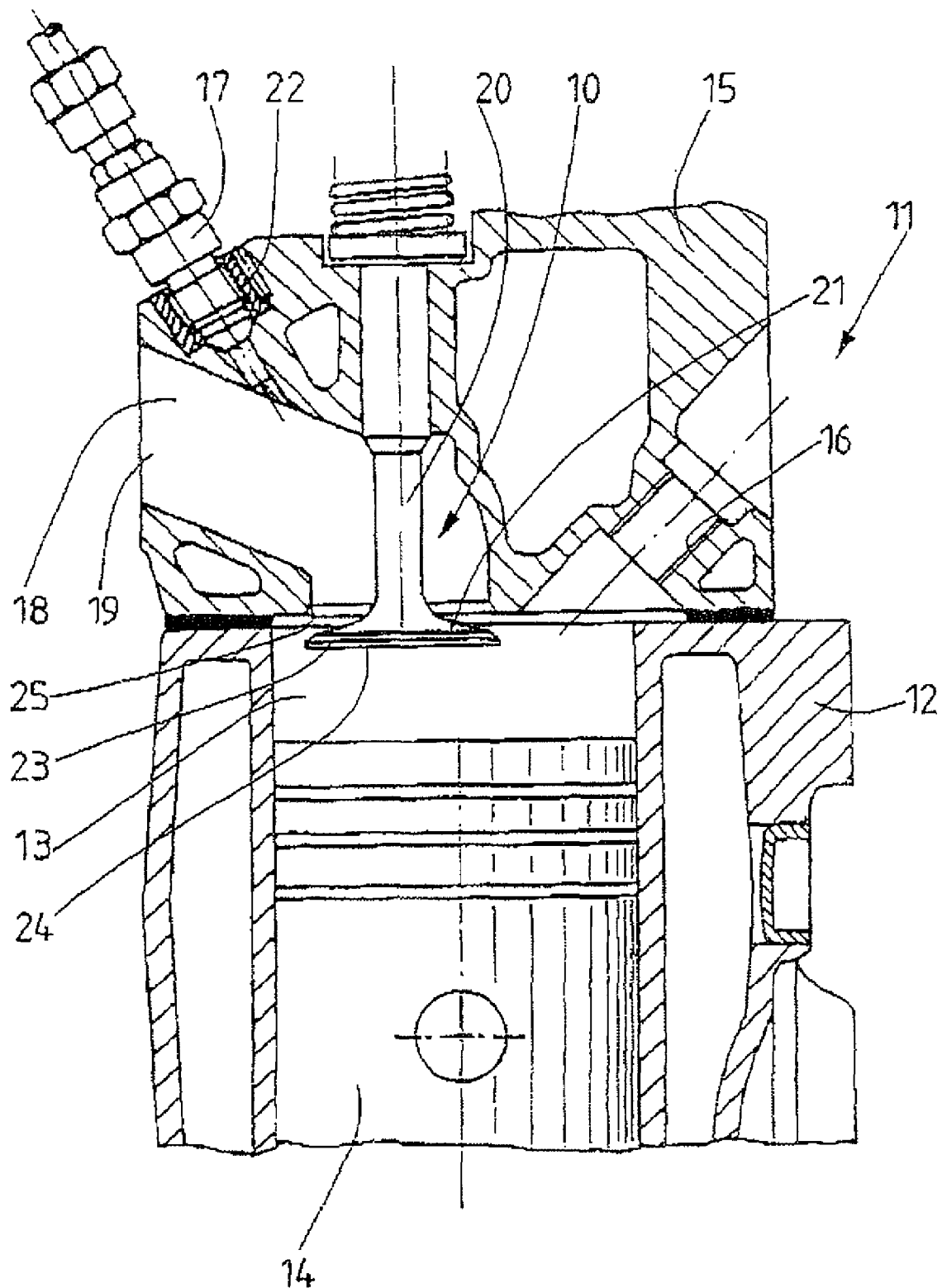

METHOD FOR DETERMINING AT LEAST THE POSITION OF A MOVABLE PART OF A DRIVE UNIT SUCH AS AN INTERNAL COMBUSTION ENGINE OR THE SIMILAR

STATEMENT OF RELATED APPLICATIONS

This application is the U.S. National Phase under Chapter II of the Patent Cooperation Treaty (PCT) of PCT International Application No. PCT/EP2005/012267 having an International Filing Date of 16 Nov. 2005, which claims priority on German patent application no. 10 2005 004 248 having a filing date of 28 Jan. 2005.

BACKGROUND OF THE INVENTION

1. Technical Field

The invention relates to a method for determining at least the position of a moving part of a drive assembly such as an internal combustion engine, transmission or the like, wherein position-related valves are determined during the movement of the respective part.

2. Related Art

In order to test and/or monitor internal combustion engines, transmissions or other drive assemblies it is necessary to determine the positions of certain moving parts. Certain positions of such moving parts and/or continuous chronological movement sequences are detected. It is known to determine the position of moving parts capacitively, magnetically, with cameras or even with lasers, for example. Each of these known measuring methods are associated with conditions of use, for example free accessibility of the part or the quality of material of said part.

BRIEF SUMMARY OF THE INVENTION

The invention is then based on the object of providing a method for determining at least the position of a moving part of a drive assembly, in particular of an internal combustion engine, of a transmission or the like, which can be used universally and supplies precise measured values.

A method for achieving this object is a method for determining at least the position of a moving part of a drive assembly, wherein position-related values are determined during the movement of the respective part, comprising the steps of (a) illuminating or exposing the part to light and (b) determining the passage of light and/or an interruption of the passage of light between the moving part and a part corresponding thereto. Accordingly, light is used to determine, preferably, the position of the moving part by determining the passage of light and/or even an interruption of the passage of light between the moving part and a fixed or likewise moving part which corresponds to the latter. The passage of light is a reliable indicator of the position of the moving part. The position of the part can thus be determined reliably using very simple means. Furthermore, the use of light makes the method according to the invention very largely independent of the part to be checked. In particular the position of any desired parts can be determined reliably and easily independently of the material of said parts and without disruptive side effects.

The position of the moving part is preferably determined at a time at which the part has assumed a position in which no or virtually no passage of light can be determined and/or a maximum passage of light can be determined. In particular, the determination of the position of the part when there is no passage of light or virtually no passage of light permits the position of the moving part to be determined surprisingly accurately because there is at least one certain position of the moving part with respect to another moving part or else nonmoving part in which a position of the moving part which prevents the passage of light occurs instantaneously due to said part bearing partially against at least one corresponding part.

In the preferred method, one side of the part is illuminated or exposed to the light while on another side, preferably a side in shadow, the passage of light which is permitted or else interrupted by the moving part is determined. The light can be applied to one side of the part either by at least one external light source or light which is present in the surroundings can be utilized. In the latter case, an external light source is not necessary. As a result, the position of a moving part which is difficult to access can also be determined continuously or at least one specific time. Particularly good measurement results can also be obtained without external light sources if the side of the moving part lying opposite the side to which light is applied is located in a space which is subjected to heavy shadow, is darkened or even completely dark. The smallest incidence of light can then be used to reliably determine a specific position of the part. However, any distance, even only a slightly changing one, between the moving part and another (moving or nonmoving) part can also be determined reliably and precisely from a dark or darkened space or a space in shadow.

Particularly advantageous measurement results can be obtained with the method according to the invention if the moving part whose position is to be determined bounds an at least relatively dark space or is located at least partially in it. If at least a portion of this part bears in a seal-forming fashion against another (moving or nonmoving) part, a passage of light is instantaneously interrupted so that the moving part places the space bounded by it completely in darkness. In this way at least one specific position of the moving part can be determined particularly reliably.

The method according to the invention can be used in such a way that the passage of light including interruptions thereof is determined continuously over time, to be specific preferably over a plurality of movement cycles of the part whose position is to be determined. In this way it is possible to represent continuously the time profile of the movement of the part. Characteristic positions, for example the position of the part at which no passage of light occurs or a maximum passage of light is detected can be reliably determined. However, it is also possible to determine the velocities of the movement of the part and/or undesired movements through the time profile for the change in the passage of light or the interruption of the passage of light, as well as selective positions.

Alternatively it is possible to determine the position of the moving part selectively only if no or no appreciable passage of light is present and/or a maximum passage of light can be detected. Specific positions of the moving part can thus be reliably determined. The determination of this specific position can also be done in a time-related fashion so that further information, for example the rotational speed of a motor or of a transmission, in particular of an automatic transmission, can be derived from the determined values.

The method is particularly suitable for determining the position of at least one valve of an internal combustion engine. Here, the passage of light is interrupted if the valve is in the closed position. The method according to the invention therefore makes it possible to determine the closed position of the respective valve particularly reliably.

The light which is necessary to carry out the method is preferably directed to the respective valve from a side which points to the valve stem. Particularly an air intake duct and/or an exhaust duct are suitable for this. In internal combustion engines with indirect injection it is also possible to use the seat and passage of a non-mounted injection valve to feed light alternatively or additionally to the side of the valve plate which points to the valve stem. The light can be ambient light or else at least one additional light source, as a result of which light is applied to the upper side of the valve particularly intensively.

Furthermore, according to the method the passage of light or the interruption thereof when the valve is closed is determined from the cylinder space at the upper side of the piston, specifically the combustion chamber. In particular when the valve is closed, the combustion chamber is dark. As a result it is possible to detect very precisely when the valve is closed.

The input of light and/or passage of light are determined by a suitable sensor, in particular a light-sensitive sensor which outputs a measurement signal which preferably changes in proportion to the intensity of the incident light. If the position of valves is determined, the light sensor can be pushed through the respective spark plug bore (when the spark plug is not screwed in) or else be inserted only into the spark plug bore. In this context, the sensor can be embodied in such a way that in the inserted state it closes off the spark plug bore in a way which does not transmit light so that as a result no incidence of light into the combustion chamber occurs. In internal combustion engines with direct injection into the combustion chamber, the sensor can also alternatively be fed through the bore of the injection nozzle (which is then not inserted). This can also be done in such a way that a passage of light between the bore of the injection nozzle and the sensor is prevented. In this case, the spark plug bore is already closed off, preferably in a way which is impermeable to light, by an inserted spark plug.

The method according to the invention is carried out in an internal combustion engine in overrun mode, with the internal combustion engine being driven at a relatively low rotational speed, for example a rotational speed between 200 and 500 min$^{-1}$, in particular approximately 100 min$^{-1}$. As a result, very good resolution of the measurement results can be achieved and the measurement can be carried out in a cold test or during cold testing of the internal combustion engine.

A preferred exemplary embodiment of the invention will be explained below with reference to the drawing. The single FIGURE of the drawing shows a cross section through an upper part of an internal combustion engine.

The invention is explained below using the example of the determination of the position of a valve 10 of the internal combustion engine 11 which is partially shown in the FIGURE. The FIGURE shows an upper part of an engine block 12 with the combustion chamber 13 sectioned in the center and an upper part of a piston 14 which is located near to the upper dead center. The lower part of the internal combustion engine 11, in particular the connecting rod, crankshaft and oil sump, are not shown. Furthermore, a cross section through a cylinder head 15 which is mounted on the engine block 12 is illustrated in the FIGURE. The section through the cylinder head 15 runs through the seat of the valve 10 which is already mounted herein in a functionally capable fashion. With respect to the FIGURE shown, a spark plug bore 16 is present just to the right of the valve 10, said spark plug bore 16 providing external access to the combustion chamber 13 when the spark plug has not yet been inserted.

The internal combustion engine 11 shown here is one with indirect injection. For this reason, an injection valve 17 is screwed into the cylinder head 15. The injection valve 17 is located on the side of the cylinder head 15 lying opposite the spark plug bore 16. The cylinder head has an air intake duct 18 on the same side as the injection valve 17 (left hand side with respect to the FIGURE). An air intake manifold is not yet connected to said air intake duct 18 so that the air supply opening 17 to the air intake duct 18 is open from the outside.

Light can be incident from the outside on the upper side 21, connected to a valve stem 20, of the valve 10 through the open air supply opening 19 of the air intake duct 18. However, at least one additional light source, for example a halogen lamp (not illustrated in the FIGURE), is arranged in the vicinity of the air supply opening 19 of the air intake duct 18 or even in the air intake duct 18. The halogen lamp can have a power of up to several 100 watts. The power of the halogen lamp is preferably in the range from 20 to 75 watts.

Alternatively or additionally, as a result of the absence of the injection valve 17 light can be directed to the upper side 21 of the valve 10 through the injection valve bore 22 which is then open. The ambient light is sufficient in this context. However, a lamp is preferably also assigned to the injection valve bore 22. It is then not necessary to assign a lamp to the air supply opening 19 so that the air intake manifold can already be connected here.

In the still free spark plug bore 16 in the cylinder head 15, a light-sensitive element is arranged. This is preferably a light sensor which is not illustrated in the FIGURE. The light sensor can be embodied in such a way that it extends through the spark plug bore 16 and is sealed with respect to it in a way which is impermeable to light so that the light sensor prevents a passage of light through the spark plug bore 16. The light sensor can be inserted so far into the spark plug bore 16 that its detection point is still in the region of the spark plug bore 16. The light sensor is however preferably of rod-shaped design and is pushed so far through the spark plug bore 16 that the light-sensitive point of the sensor is located in the upper region of the combustion chamber 13 which the piston 14 itself does not reach in its uppermost position (top dead center). As a result, the light sensor can detect the passage of light in the vicinity of the valve plate 23 of the valve 10, in particular of the underside 24 of the valve plate 23, with its light-sensitive measuring point.

The method according to the invention proceeds, for the purpose of determining the position of a valve 10, preferably of each valve 10, in particular of the respective valve position, as follows:

The internal combustion engine 11 is premounted to such an extent that it can be driven in overrun mode in the non-activated state. The method according to the invention can thus be carried out during what is referred to as the cold testing of the internal combustion engine 11. In particular, the cylinder head 15 is mounted with the valves 10. The valves can also be activated by means of the camshaft by virtue of the fact that they move up and down in the cylinder head 15, as would be the case when the internal combustion engine 11 would be activated. In the exemplary embodiment shown, only the air supply manifold is not yet mounted on the air intake ducts 18, and the spark plugs have not yet been inserted into the spark plug bores 16.

Light from a preferably separate light source is now directed into the air intake duct 18 through the air supply opening 19. The light is directed at the upper side 21 of the valve plate 23 and when the valve 10 is entirely or partially opened said light passes through an intermediate space between the valve plate 23 and a valve seat 25 on the underside of the cylinder head 15 and into the combustion chamber 13.

A light sensor or some other light-sensitive means is inserted into the spark plug bore 16 or passed through it. This is preferably done in a way which does not transmit light so that no light can pass through between the light sensor and the spark plug bore 16. Accordingly, light can already pass through the air intake duct 18 and into the combustion chamber 13 even when the valve 10 is entirely or partially opened.

As the valve 10 increasingly opens, the incidence of light into the combustion chamber 13 increases by virtue of the fact that increasingly more light passes through between the valve plate 23 and the valve seat 25 and into the combustion chamber 13. When the valve 10 is completely closed, the passage of light between the valve plate 23 and the valve seat 25 and thus the incidence of light into the combustion chamber 13 is briefly entirely interrupted so that the combustion chamber 13 is completely darkened. When the valve 10 is completely closed, the light sensor thus receives a uniquely defined signal. The light sensor receives a further uniquely defined signal when the valve 10 is completely opened if the incidence of light into the combustion chamber 13 is at a maximum.

The position of the respective valve 10 of the internal combustion engine 11 is determined in the overrun drive mode of the same at a rotational speed of up to 200 min$^{-1}$, preferably approximately 100 min$^{-1}$. In this context, it is continuously determined whether and how much light enters the combustion chamber 13 through the intermediate space between the valve plate 23 and the valve seat 25. The measurement of the light intensity in the combustion chamber 13 and the complete darkening thereof is preferably carried out in a timed fashion as a result of which owing to the proportionality between the intensity of the light in the combustion chamber 13 or the brief darkening thereof the position of the respective valve 10 can be determined with respect to the operating cycle of the internal combustion engine 11. In particular, because of the complete darkening of the combustion chamber 13 when the valves 10 are completely closed it is possible to draw reliable conclusions about the closed position of the valves 10.

According to the inventive method, the position of each valve 10 of the internal combustion engine 11 is preferably determined continuously per se, in which case the ignition sequence and the time interval between the complete closing of the individual valves 10 can be detected in particular by reference to the closed positions of the valves 10 which can be determined in a defined fashion.

As an alternative to the method described above, the respective valve 10 can also be irradiated with light from the exhaust duct or the light is fed to the respective valve 10 via the exhaust duct and air intake duct 18.

Alternatively, in the case of indirect injection, such as occurs in the internal combustion engine 11 shown in the FIGURE, the supply of light can also be carried out additionally or only through the injection valve bore 22 when the injection valve 17 is not mounted.

In internal combustion engines with direct injection, where the injection valve bore opens directly into the combustion chamber 13, the light sensor can also determine the intensity of the light in the combustion chamber 13 through the injection valve bore so that the spark plugs can then be mounted.

The method according to the invention is also suitable for determining at least the position of other moving parts of internal combustion engines, transmissions or other drive assemblies. In internal combustion engines it is possible, for example, to determine the positions of cam shafts and crankshafts, pistons or the like. It is not absolutely necessary here for the passage of light to be determined in a dark or virtually dark combustion chamber 13. The passage of light can also be determined on a side of the component which faces away from the light source and is exposed to the ambient light.

The method according to the invention can also be used in transmissions of any type, specifically manual gearboxes and automatic transmissions. In the case of automatic transmissions the method according to the invention can be used, for example, to determine the position of gear shift plates.

LIST OF REFERENCE NUMERALS

10 Valve
11 Internal combustion engine
12 Engine block
13 Combustion chamber
14 Piston
15 Cylinder head
16 Spark plug bore
17 Injection valve
18 Air intake duct
19 Air supply opening
20 Valve stem
21 Upper side
22 Injection valve bore
23 Valve plate
24 Underside
25 Valve seat

The invention claimed is:

1. A method for determining at least the position of a moving part of a drive assembly during testing or monitoring the drive assembly, wherein position-related values are determined during the movement of the respective part, comprising the steps of:
    (a) illuminating or exposing the part to light; and
    (b) determining the passage of light or an interruption of the passage of light between the moving part and a part corresponding thereto with at least one light-sensitive measuring element,
    wherein the drive assembly is an internal combustion engine (10) having at least one valve (10) and the position of the at least one valve (10) is determined at least in a respective closed position, and
    wherein the light is fed to the respective valve (10) from a side (21) which points to a valve stem (20) of the respective valve (10),
    whereby the position of the part is determined by incidence of light on the at least one light-sensitive measuring element.

2. The method as claimed in claim 1, wherein the position of the moving part is determined at a time at which no or virtually no passage of light or a maximum passage of light can be determined.

3. The method as claimed in claim 1, wherein one side of the part is illuminated or exposed to light and the passage of light or the interruption thereof are determined on another side of the part.

4. The method as claimed in claim 3, wherein the one side of the part is illuminated by at least one light source.

5. The method as claimed in claim 1, wherein the passage of light is determined on a side of the part which is located at a relatively dark location.

6. The method as claimed claim 1, wherein the passage of light, or the interruption, thereof, is determined continuously.

7. The method as claimed in claim 1, wherein only the absence or a maximum passage of light is determined selectively.

8. The method as claimed in claim 6, wherein the interruption of the light is determined continuously during a plurality of movement cycles of the part.

9. The method as claimed in claim 7, wherein only the absence or a maximum passage of light is determined continuously.

10. The method as claimed in claim 1, wherein the passage of light or the interruption thereof is determined when the valve (10) is respectively closed, and on the basis of a piston-end cylinder space (13).

11. The method as claimed in claim 10, wherein the determination of the passage of light or the interruption thereof into the combustion chamber (13) is carried out through at least one spark plug bore (16) or one injection nozzle bore.

12. The method as claimed in claim 1, wherein the at least one light-sensitive measuring element is used to determine the intensity of the passage of light or to interrupt the passage of light.

13. The method as claimed in claim 1, it wherein the method is carried out with the drive assembly on an internal combustion engine (11) during a cold test.

14. The method as claimed in claim 13, wherein the drive assembly on the internal combustion engine (11) is driven or towed during the determination of at least that position of a moving part with a rotational speed of up to 200 $\text{min}^{-1}$.

15. The method as claimed in claim 11, wherein the determination of the interruption of the passage of the passage of the light into the combustion chamber (13) is carried out through at least one spark plug bore (16) or one injection nozzle bore.

16. The method as claimed in claim 14, wherein the drive assembly on the internal combustion engine (11) is driven or towed during the determination of at least that position of a moving part with a rotational speed of approximately 100 $\text{min}^{-1}$.

17. The method as claimed in claim 1, wherein the light is fed to the respective valve (10) through an opening selected from the group consisting of an air intake duct (18), an exhaust duct, and an injection nozzle bore.

18. The method as claimed in claim 10, wherein the interruption of the passage of the light is determined when the valve (10) is respectively closed.

19. A method for determining at least the position of a moving part of a drive assembly during testing or monitoring the drive assembly, wherein position-related values are determined during the movement of the respective part, comprising the steps of:
(a) illuminating or exposing the part to light; and
(b) determining the passage of light or an interruption of the passage of light between the moving part and a part corresponding thereto with at least one light-sensitive measuring element,
wherein the drive assembly is an internal combustion engine (10) having at least one valve and the position of the at least one valve (10) is determined at least in a respective closed position, and
wherein the passage of light or the interruption, thereof is determined when the at least one valve (10) is respectively closed, and on the basis of a piston-end cylinder space (13),
whereby the position of the part is determined by incidence of light on the at least one light-sensitive measuring element.

20. The method as claimed in claim 19, wherein the position of the moving part is determined at a time at which no or virtually no passage of light or a maximum passage of light can be determined.

21. The method as claimed in claim 19, wherein one side of the part is illuminated or exposed to light and the passage of light or the interruption thereof are determined on another side of the part.

22. The method as claimed in claim 21, wherein the one side of the part is illuminated by at least one light source.

23. The method as claimed in claim 19, wherein the passage of light is determined on a side of the part which is located at a relatively dark location.

24. The method as claimed claim 19, wherein the passage of light, or the interruption, thereof, is determined continuously.

25. The method as claimed in claim 19, wherein only the absence or a maximum passage of light is determined selectively.

26. The method as claimed in claim 19, wherein the light is fed to the respective valve (10) from a side (21) which points to a valve stem (20) of the respective valve (10).

27. The method as claimed in claim 19, wherein the determination of the passage of light or the interruption thereof into the combustion chamber (13) is carried out through at least one spark plug bore (16) or one injection nozzle bore.

28. The method as claimed in claim 19, wherein the at least one light-sensitive measuring element is used to determine the intensity of the passage of light or to interrupt the passage of light.

29. The method as claimed in claim 19, it wherein the method is carried out with the drive assembly on an internal combustion engine (11) during a cold test.

30. The method as claimed in claim 29, wherein the drive assembly on the internal combustion engine (11) is driven or towed during the determination of at least that position of a moving part with a rotational speed of up to 200 $\text{min}^{-1}$.

31. The method as claimed in claim 24, wherein the interruption of the light is determined continuously during a plurality of movement cycles of the part.

32. The method as claimed in claim 25, wherein only the absence or a maximum passage of light is determined continuously.

33. The method as claimed in claim 26, wherein the light is fed to the respective valve (10) through an opening selected from the group consisting of an air intake duct (18), an exhaust duct, and an injection nozzle bore.

34. The method as claimed in claim 19, wherein the interruption of the passage of the light is determined when the valve (10) is respectively closed.

35. The method as claimed in claim 27, wherein the determination of the interruption of the passage of the passage of the light into the combustion chamber (13) is carried out through at least one spark plug bore (16) or one injection nozzle bore.

36. The method as claimed in claim 30, wherein the drive assembly on the internal combustion engine (11) is driven or towed during the determination of at least that position of a moving part with a rotational speed of approximately 100 $\text{min}^{-1}$.

* * * * *